H. I. SMITH.
FISHING TOOL.
APPLICATION FILED AUG. 2, 1920.
1,402,677. Patented Jan. 3, 1922.
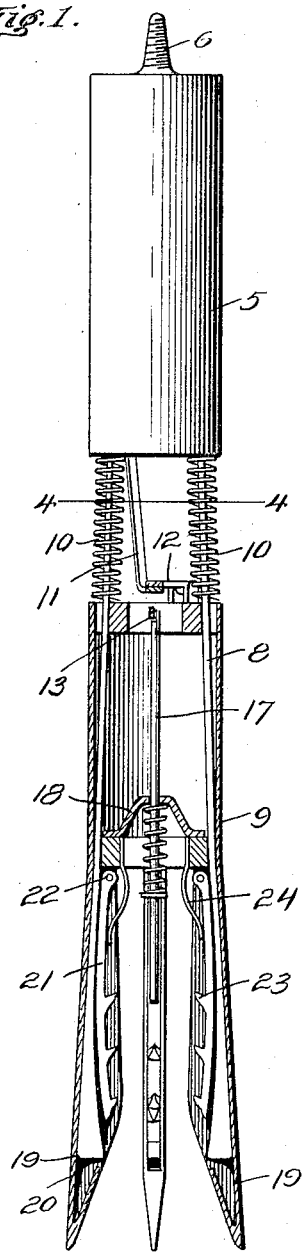
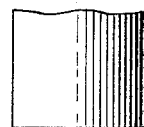
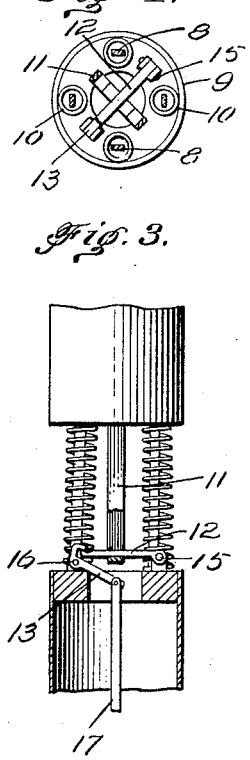
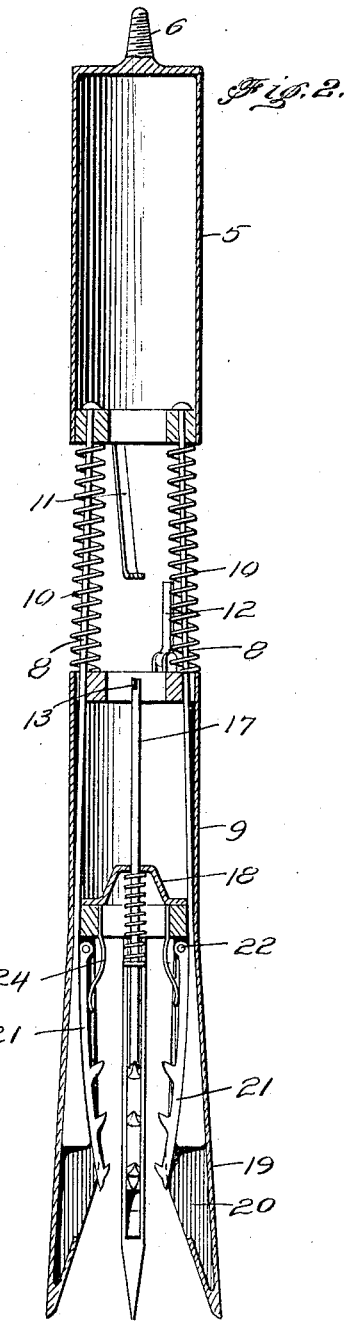
Inventor
H. I. Smith.
By Geo. P. Kimmel
Attorney

UNITED STATES PATENT OFFICE.

HARRY IRVIN SMITH, OF GLEZEN, INDIANA.

FISHING TOOL.

1,402,677. Specification of Letters Patent. Patented Jan. 3, 1922.

Application filed August 2, 1920. Serial No. 400,597.

*To all whom it may concern:*

Be it known that I, HARRY IRVIN SMITH, a citizen of the United States, residing at Glezen, in the county of Pike and State of Indiana, have invented certain, new and useful Improvements in Fishing Tools, of which the following is a specification.

This invention has for its object to provide an improved fishing tool especially designed for facilitating the removal of cables, bits and such other objects as may fall into drilled wells wherein the grab jaws are automatically actuated by compression springs normally held against operation by a novel type of locking mechanism controlled by a trigger rod.

A further object is the provision of a fishing tool of this type wherein contraction of the grab jaws is automatically effected by a spring actuated device controlling a series of cam rods whereby the jaws are positively moved into firm grip with the object grasped thereby.

With these and other objects in view, the invention consists in certain novel features of construction as hereinafter shown and described and then specifically pointed out in the claims and in the drawings illustrative of the preferred embodiment of the invention.

In the accompanying drawings:

Figure 1 represents a side view of the fishing tool, partly in section.

Fig. 2 represents a vertical sectional view through the tool.

Fig. 3 represents a fragmental detail of the tripping mechanism, and,

Fig. 4 is a transverse sectional view on the line 4—4 of Fig. 1.

Referring to the drawing in detail, wherein similar reference numerals designate corresponding parts throughout the several views the numeral 5 indicates the body member of the fishing tool which is preferably of cylindrical form so as to readily pass through a drilled well and which is provided at its upper extremity with a threaded stud 6 adapted to be threaded onto the lower end of a drill bar or stem (not shown) or to have threaded thereon a cable attaching eye (not shown) as may be desired or necessary, whereby the tool may be lowered and raised into and from a well. The upper terminals of the shanks of a series of downwardly diverging cam rods 8 are secured internally of the body member 5 and extend downwardly through the jaw supporting member 9 which latter is preferably of hollow tubular form and is slidably mounted upon the intermediate portions of the cam rods 8 for movement independently of the body member 5.

Compression springs 10 are coiled about the cam rods 8 intermediate the body member 5 and the jaw supporting member 9 whereby the latter is normally maintained in outwardly projected position with relation to the member 5.

As stated, the springs 10 normally tend to separate the members 5 and 9 and in order to maintain said members in relatively close relation against the tension of the springs, a locking device including a loop 11, a locking bar 12 and a trigger 13 are provided. The loop 11 is secured to and depends from the body member 5 to a point convenient for the same to engage underneath the bar 12 when the latter is in locked engagement with the annular extremity 14 of the trigger 13. The bar 12 is pivotally secured at 15 to the top edge of the jaw supporting member 9 and is adapted to extend diametrically across the open end of the latter and be engaged by the angular extremity or latch portion 14 of the trigger which latter is pivotally secured at 16 to the edge of the member 9 at a point diametrically opposite the pivotal support 15 of the bar. As the body member 5 is moved downwardly toward the jaw supporting member 9, the terminal of the locking bar 12 is passed through the loop 11 and engaging behind the angular extremity 14 of the trigger 13, effectively locks the members 5 and 9 in such position as to maintain the springs 10 under tension.

The inner extremity of the trigger 13 terminates in approximate alinement with the vertical axis of the cylindrical jaw supporting member 9 and is pivotally connected with a vertically movable trigger rod 17 which latter extends beyond the lower terminal of the member 9 and is movably supported in guides 18.

A plurality of guide fingers 19 corresponding in number to the number of cam rods 8 is secured to and project longitudinally from the lower extremity of the jaw supporting member 9 and each finger is formed on its inner face with a longitudinal channel 20 forming a guide and seat for the cam rod 8. Jaws 21 are pivotally secured at 22 to the upper extremities of the fingers 19 between the walls of the channels therein and confine the cam rods 8 within the channels. The lower extremities of the jaws 21 are slightly curved inwardly and when expanded are adapted for reception in the channels 20, being provided with upwardly directed gripping teeth 23.

The jaws 21 are normally retained in outwardly extended or expanded position within the channels of the guide fingers 19 by springs 24 which are rigidly secured to the base of the jaw supporting member 9 and press, at their lower extremities against the inner surfaces of the jaws. Cams are formed upon the inner surfaces of the lower extremities of the cam rods 8 and coact with the outer curved faces of the jaws 21 to move the latter inwardly incident to upward movement of the cam rods with relation to the fingers 19, as when the trigger 13 is tripped releasing the loop 11 and permitting the body member 5 to be projected upwardly under the influence of the springs 5.

What I claim is:

1. A fishing tool comprising a body member, a plurality of jaws, a supporting member for the jaws, cam rods carried by the body member arranged to contract the jaws incident to movement of the jaw supporting member in one direction relative to the body member, actuating means normally tending to actuate the body member and jaw supporting member to effect contraction of the jaws, and trigger controlled locking means for maintaining the jaws in expanded condition.

2. A fishing tool comprising a body member, a plurality of jaws, a supporting member for the jaws, cam rods carried by the body member arranged to contract the jaws incident to movement of the jaw supporting member in one direction relative to the body member, actuating means normally tending to separate the body and jaw supporting members to effect contraction of the jaws, a locking bar engageable with the body member, a trigger engageable with the locking bar for interrupting the function of the actuating means, and an object actuated trigger rod connected with the trigger and extended into proximity with the jaws.

3. A fishing tool comprising a body member, a plurality of jaws, a supporting member carried by the jaws, body guiding fingers carried by the jaw supporting member, cam rods carried by the body member, extending along the guide fingers and arranged to contract the jaws incident to movement of the jaw supporting member relative to the body member, means normally tending to actuate the body and jaw supporting members to effect contraction of the jaws, and trigger controlled locking means for interrupting function of the actuating means.

4. A fishing tool comprising a body member, a plurality of jaws, fingers pivotally supporting the jaws and constituting seats therefor, a finger supporting member carried by the fingers, a plurality of cam rods carried by the body member and extending along the fingers and arranged to contract the jaws incident to relative movement of the jaw supporting member in one direction with relation to the body member, spring means confined between the body and jaw supporting members normally tending to actuate the jaw supporting member to effect contraction of the fingers, a loop carried by the body member, a locking bar carried by the finger supporting member and engageable with the loop to interrupt the function of the spring means, and a trigger for locking the bar in position.

In testimony whereof I affix my signature hereto.

HARRY IRVIN SMITH.